(12) United States Patent
Im (10) Patent No.: US 8,439,294 B2
(45) Date of Patent: May 14, 2013

(54) HIGH SPEED AIRSHIP STRUCTURE

(76) Inventor: Sunstar Im, Lancaster, CA (US)

( * ) Notice: Subject to any disclaimer, the term of this patent is extended or adjusted under 35 U.S.C. 154(b) by 747 days.

(21) Appl. No.: 12/384,802

(22) Filed: Apr. 9, 2009

(65) Prior Publication Data
US 2010/0276546 A1    Nov. 4, 2010

(51) Int. Cl.
 *B64B 1/06* (2006.01)
(52) U.S. Cl.
 USPC .......................................................... 244/30
(58) Field of Classification Search .............. 244/30, 244/31, 24, 25, 94–99, 125–128, 36
 See application file for complete search history.

(56) References Cited

U.S. PATENT DOCUMENTS

| | | | | |
|---|---|---|---|---|
| 340,610 | A * | 4/1886 | Patterson | 244/30 |
| 356,743 | A * | 2/1887 | Braun | 244/30 |
| 1,351,301 | A * | 8/1920 | Pritelli | 244/97 |
| 1,509,527 | A * | 9/1924 | Parker | 244/95 |
| 1,681,848 | A * | 8/1928 | Fox | 244/30 |
| 2,778,585 | A * | 1/1957 | Tschudy | 244/30 |
| 3,486,719 | A * | 12/1969 | Bock et al. | 244/25 |
| RE28,454 | E * | 6/1975 | Fitzpatrick et al. | 244/25 |
| 4,149,688 | A * | 4/1979 | Miller, Jr. | 244/12.4 |
| 5,034,751 | A * | 7/1991 | Miller, Jr. | 342/368 |
| 5,143,322 | A * | 9/1992 | Mason | 244/96 |
| 5,285,986 | A * | 2/1994 | Hagenlocher | 244/97 |
| 5,823,468 | A * | 10/1998 | Bothe | 244/2 |
| 6,293,493 | B1 * | 9/2001 | Eichstedt et al. | 244/30 |
| 6,315,242 | B1 * | 11/2001 | Eichstedt et al. | 244/30 |
| 6,880,783 | B2 * | 4/2005 | Munk | 244/25 |

* cited by examiner

*Primary Examiner* — Tien Dinh (57) ABSTRACT

The structure provided multi-Levels of the center fuselage, two front wings, Extended mid-two wings and two rear wings with two vertical winglets.
The fuselage has a cross section of half circle shaped fuselage.
The first level comprises multi-fuel tanks, water tanks, Helium gas tanks, hydraulic, Pneumatic systems and plurality of the multi-landing gear bays and multi-cargo Compartments.
The first level comprises a top cockpit and the plurality of the multi-passenger Cabins.
The second level is comprises multi-central posts, multi-guy wires on the top center Beams, mid level, lower level center beams, leak proof sealed floor gates for the Multi-gas envelopes structure, under belly multi-pontoon air bags.
The first level further comprises multi-jet power plants with multi-chute flaps.
The second level may comprises, carbon fiber honey comb sandwich composite Multi-envelopes and multi-level soft gas envelopes.

5 Claims, 10 Drawing Sheets

HIGH SPEED AIRSHIP STRUCTURE

BACK GROUND OF THE INVENTION

The present invention relates to lighter than air vehicle more particularly relates to Lighter than air vehicle which includes a first level and second level construction of The airship.

The airship comprises the first level which disposed with a ridged floor fuselage Structure. The second level is enveloped in a disposed leak proof rubber coated Carbon fiber honeycomb sandwich composite which is covering the top of the Center beam and attached to the edge of the second level floor fuselage.

The lighter than air gas is injected into the enveloped structure which is then blown And expanded in all areas of the enveloped structure.

Therefore the bottom fuselage of the enveloped structure becomes buoyant and Floats naturally in the air, which is why it is called an airship. This specialty airship Comprises a multi-jet powered plants on the front wings, rear wings and mid Extended wings for the high altitude and high speed transportation we call airship. This airship is comprised with a jet air stream chute flap and a jet powered plant which give the airship a forward vertical take off and landing capability. The jet chute Flap may operate in a up and down position to guide jet air stream flow while being Down position by the jet chute flat. During vertical take off, the airship and two Guided jet air stream flow bring them to the up position. During vertical landings, The jet chute flat is the versatility solution for take off and landing operation of the Airship.

The fuselage structure has a cross section which has a substantial half circle fuselage Shaped in a direction of the width, which also comprises a sharp half cone flat Shaped at the front end of the fuselage as well as the rear end of the fuselage. the Fuselage of the airship is for carrying load such as passenger and freight.

The front wings and rear wings is where the airship gets the lifting and lowering Force by a control method.

The shape and size of the wings depend on the fluid dynamics as well as the fuselage Comprised in the front wings and rear wings which gives control to the flight of the Airship. An airship has a half circle shaped fuselage in the direction of the width which the leak proof rubber coated carbon fiber honey comb composite is enveloped, Covered and sealed on top. The edge of the center beam and to the edge of the floor Structure is pressurized with helium gas that is injected into the enveloped structure. The structure becomes fully inflated and naturally floats in the air, which is a Fuselage structured airship.

PRIOR ARTS INCLUDED U.S. PATENTS

| | | | |
|---|---|---|---|
| 3,972,492 | 4,149,688 | 4,259,776 | 5,026,003 |
| 5,034,751 | 5,096,141 | 5,285,986 | 5,346,162 |
| 5,449,129 | 5,755,402 | 6,119,983 | 6,167,263 |
| 6,293,493 | 6,302,357 | 6,305,641 | 6,311,925 |
| 6,315,242 | 6,427,943 | 6,471,159 | 6,527,223 |
| 6,568,631 | 6,572,053 | 6,607,163 | 7,131,613 |
| 7,207,256 | 7,261,255 | 7,303,166 | 7,316,197 |

To accomplish many objectives which were not possible, it is necessary to break the Well established ideas and concepts about the fuselage with high pressurized Helium gas which is enveloped at the front and rear wings. A need for an airship Structure Has been present for a long time. This invention is directed to solve these problems And satisfy the long felt need.

SUMMARY OF THE INVENTION

The present invention contrive to solve the disadvantages of the prior art and Objective.

The invention is to provide pressurized lighter than air gas which is injected into the Enveloped structure, covered and sealed on top of the edge on the flat floor fuselage Structure.

Another objective of the invention is to provide an airship structure which comprises A sharp and half flat cone shape at the front end of the fuselage and the rear end of The fuselage structure. A substantially flat floor fuselage in which includes the cargo Bay, passenger cabin, cockpit and landing gear bays.

One of the objective of the invention is to provide an airship structure which includes Fuselage with two levels. Second objective of the invention is to provide an airship Structure which includes carbon fiber honey comb sandwich composite envelop which Is covered on top of the second level fuselage. Also the invention is to provide an Airship structure which includes rubber coated leak proof gas bag of envelop which Disposed a multi-stage level of envelop on second level fuselage structure.

Third objective of the invention is to provide an airship structure which includes a Envelope covered on the second level which includes a ridged envelop on top level And soft envelope in upper level, middle level, lower level position of the fuselage Structure which is located on the second level of the fuselage.

The aspect of the invention is to provide an airship structure for an airship which Comprises a fuselage that has two front wings with two vertical winglets and the rear wings with two vertical winglets. The first level and second level is intercooperated. The fuselage has a cross section of substantial half circle shaped fuselage in a Direction of the width. The fuselage is wide enough to provide lifting force of the Airship and comprises top levels which is separated by a multi-partition structure, Which is constructed with a carbon fiber honey comb sandwich composite panel. The Two front wings are disposed horizontally in the front portions of the fuselage and is Configured to control the flight of the airship. The two rear wings are disposed Horizontally in the rear portions of the fuselage and are configured to control the Flight of the airship. The two vertical winglets are disposed at the wing tips and the Rear wings.

The first level is disposed at the body of the fuselage. The two levels of the fuselage And comprised plurality of the fuel tank storages which comprised a plurality of the partition compartments. The first level is configured to anchor the front wings and The rear wings. The first level is disposed at the fuselage body of the two levels of The airship and the comprised plurality of the landing gear bays which may be Aligned in parallel to the first level. It also opens downwardly from under the belly Portion of the fuselage.

The first level may comprise a plurality of the hydraulic operating systems and the Pneumatic systems for controlling the landing gears. Each of the fuselage, walls, Floors and upper floors may comprise a plurality of carbon fiber honey comb Sandwich composite panels which is inter-connected and glued with edge angle Corner bits of carbon fiber. The whole fuselage structure is constructed with carbon Fiber honey comb composite'panels and cross inter-connected with glued angle Patch of carbon fiber skin.

The first level may comprise a plurality of the fuselage, walls and floors. An upper Level floors is cross inter-connected by glue which is patched and reinforced with Carbon fiber fabric. The first level may further comprise one or more water tank Storage stations, valves and controlling gauges for the airship auto control weight Balancing from the front fuselage to rear fuselage structure.

The first level may comprise one of more pumping stations, valves, control gauges For the water tank storages, fuel tank storages, helium gas tank storages and Hydraulic tanks. The first level may comprises, one of more fuel tank storages. The First level may further comprises one or more pressurized helium gas tank storages. The first level may comprise a multi-jet power plant provided on a portion of the two Front wings. Two rear wings and two mid-extended wings for the high altitude and High speed.

An airship comprised jet air stream chute flap and a jet powered plant with a forward Vertical take off and landing capability with jet chute flaps may operate in an up and Down position to guide the jet air stream flow to the down position. When the Vertical take off of the airship and two guided jet air stream flow is placing the jet Chute flap in the up position is when vertical landing of the airship is the versatility Solution for take off and landing of the operation of the airship.

The first level may be integrated with two front wings and two rear wings. Each of The two front wings and two rear wings may comprise one or more elevons and each Of the two vertical winglets may comprise a stability.

The second level is disposed at the fuselage body of the two levels of the fuselage. It Comprises a plurality of the multi-center post. Each of the plurality is longitudinally Set from the center post to another edge of the fuselage floor along from the front End of fuselage to rear end of the fuselage. The second level is disposed at the Fuselage and comprises a plurality of the center post. Each of the center post is Anchoring the guy wire to the edge of the floor structure of the fuselage. The guy Wire is a braced crossed link which is diagonal and each of the center post is Anchoring the guy wire along longitudinally from front end of the fuselage to the rear End of the fuselage.

The second level plurality of the center beam is anchored to the top of the each Center post longitudinally from front end of the fuselage to the rear end of the Fuselage. The second level is disposed at the fuselage body of the two levels. It Comprises a plurality of the top level envelop which disposes a carbon fiber honey Comb sandwich composite envelop which is covered on top of the center beam and Anchored by glue. The second levels of the fuselage comprises a plurality of a Multiple soft envelop covered in a multi-level position located on the second levels of The fuselage, top level position, mid level position, lower level position of the second Level of fuselage and each level position of the anchored soft envelope covered in Each level position of the center beam through to the edge of the floor fuselage Structure as well as along the front portion of the fuselage through the end position Of the rear fuselage.

The fabric roof of the tent structure is the second level disposed at the fuselage body Of the two levels of the fuselage and comprises a plurality of the each envelop Anchored, leak proof sealed, glued air tight at the edge of the fuselage. the second Level is disposed at the fuselage body of the two levels of the fuselage and Comprises a plurality of the gate on the each envelop floor space with sealed tight Gate for repair and inspection. another aspect of the invention provides an airship Structure for an airship comprising a fuselage having a cross section of substantial Half fuselage shaped in a width direction. the fuselage is wide enough to provide Lifting force.

The advantages of the present invention is that the airship structure can provide More lift, accommodate more space separated independently and a wide body Fuselage structure.

Although the present invention is briefly summarized the fuller understanding of the invention can be obtained by the followings detailed description and appended Claims.

BRIEF DESCRIPTION OF THE DRAWINGS

These and other features, aspects and advantages of the present invention will Become a better understood with reference to the accompanying drawings where in.

DETAILED DESCRIPTION EMBODIMENT OF THE INVENTION

FIGS. 1-7, shows an airship 100. According to embodiment of the present invention.

FIGS. 8-16, shows an airship 100. Inner structure of the airship.

The airship structure for an airship 100, comprises a fuselage 10.

The airship structure for an airship 100, may further comprises two front wings 20 And two vertical winglets 40, two rear wings 30, and two vertical winglets 50, as Shown FIGS. 1, 2, 3, 4, 5, 6 and 7.

The airship structure for an airship 100 may comprises first level 12, and second Level 14. The airship structure for an airship 100 may second level comprises Multiple center post 60, support carbon fiber composite center beam 66, hold and Anchor the carbon fiber honey comb composite envelope 55. Which attached Anchored on top of the center beam and glued, sealed and edge 48, of all around the Floor fuselage structure as shown FIGS. 8, 9, 10, 14, 15 and 16.

The airship structure for an airship 100 may further comprises second level 14, multi Level position of soft envelop 65, 75, 85 attached glued sealed each envelop level position of the center beam 66, 67, 68 and through the edge of the floor fuselage Structure as shown in FIGS. 8, 9, 11, 14, 15 and 16.

The airship structure for an airship 100 may comprises the guy wire 70, 80, 90 to Anchor the center post 60 to the edge 46, of the floor fuselage structure of each Envelope floor as shown in FIGS. 8, 9, 10, 14, 15 and 16.

Figure 1:
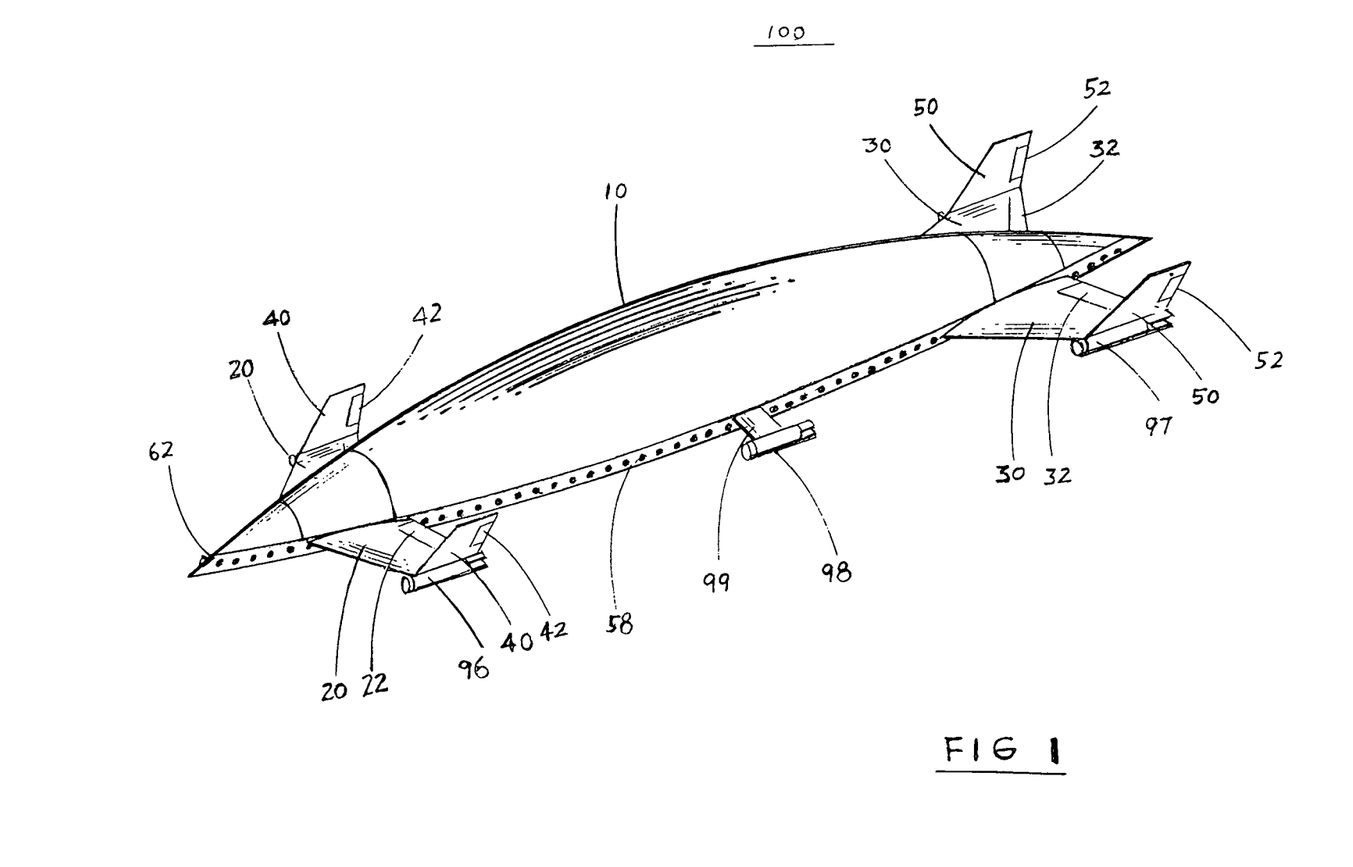
FIG. 1. is a perspective view showing an airship having a structure according to an Embodiment of the present invention.
Figure 2:
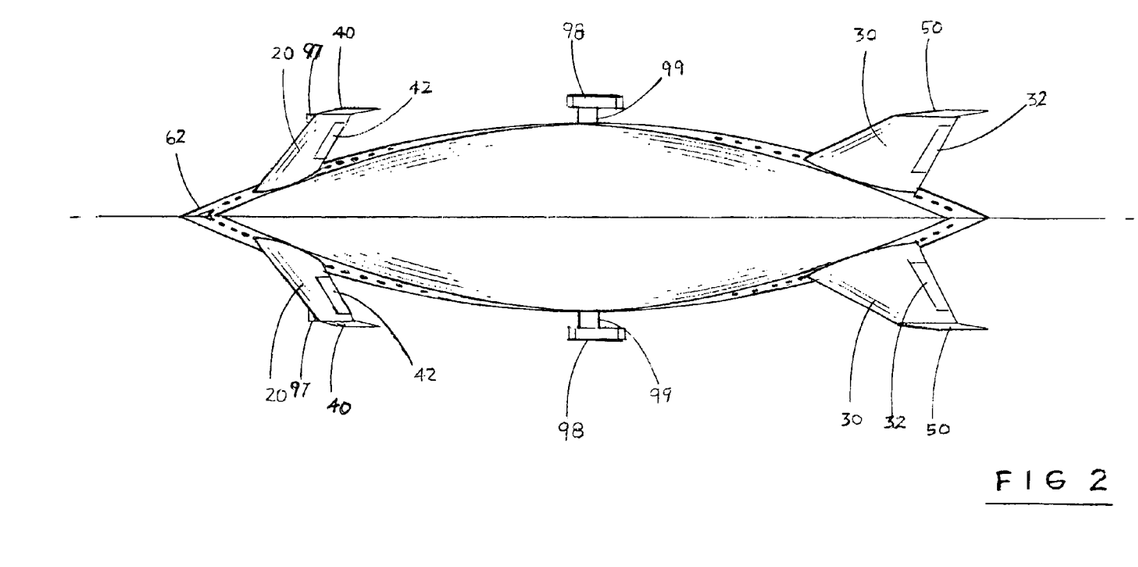
FIG. 2. is a top plan view of the airship of FIG. 1.
Figure 3:
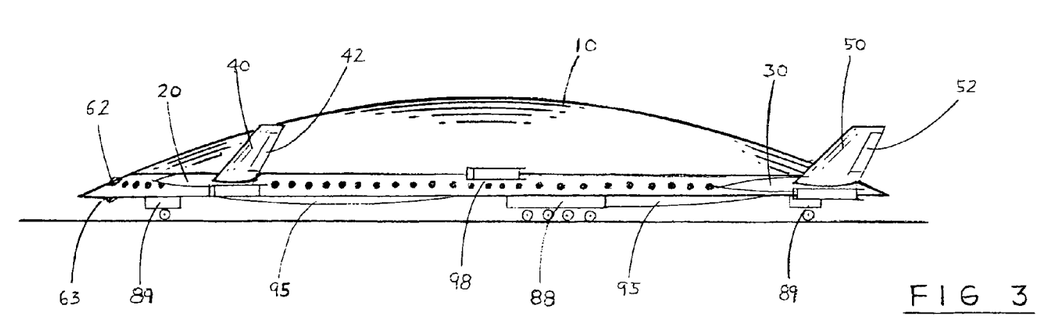
FIG. 3. is a side plan view of the airship of FIG. 1.
Figure 4:
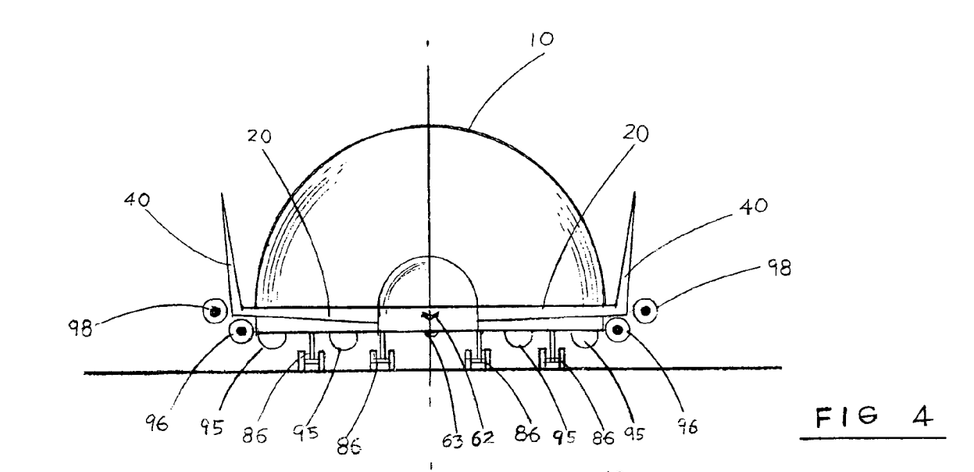
FIG. 4. is a front plan view of the airship of FIG. 1.
Figure 5:
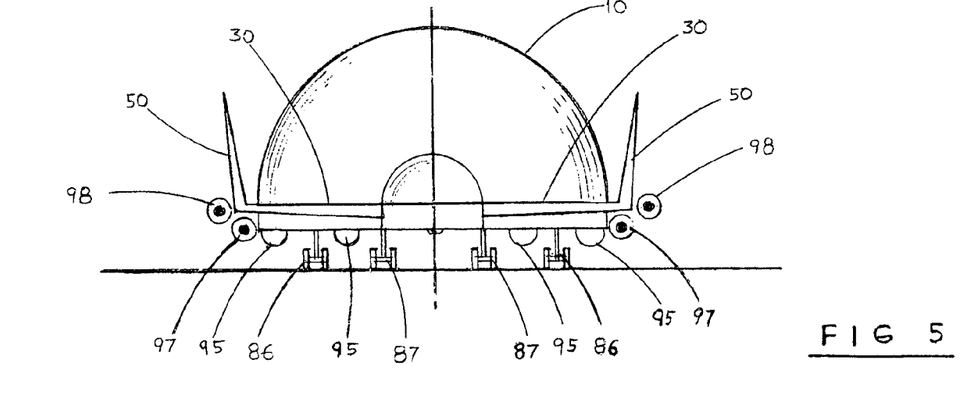
FIG. 5. is a rear plan view of the airship of FIG. 1.
Figures 6, 7:
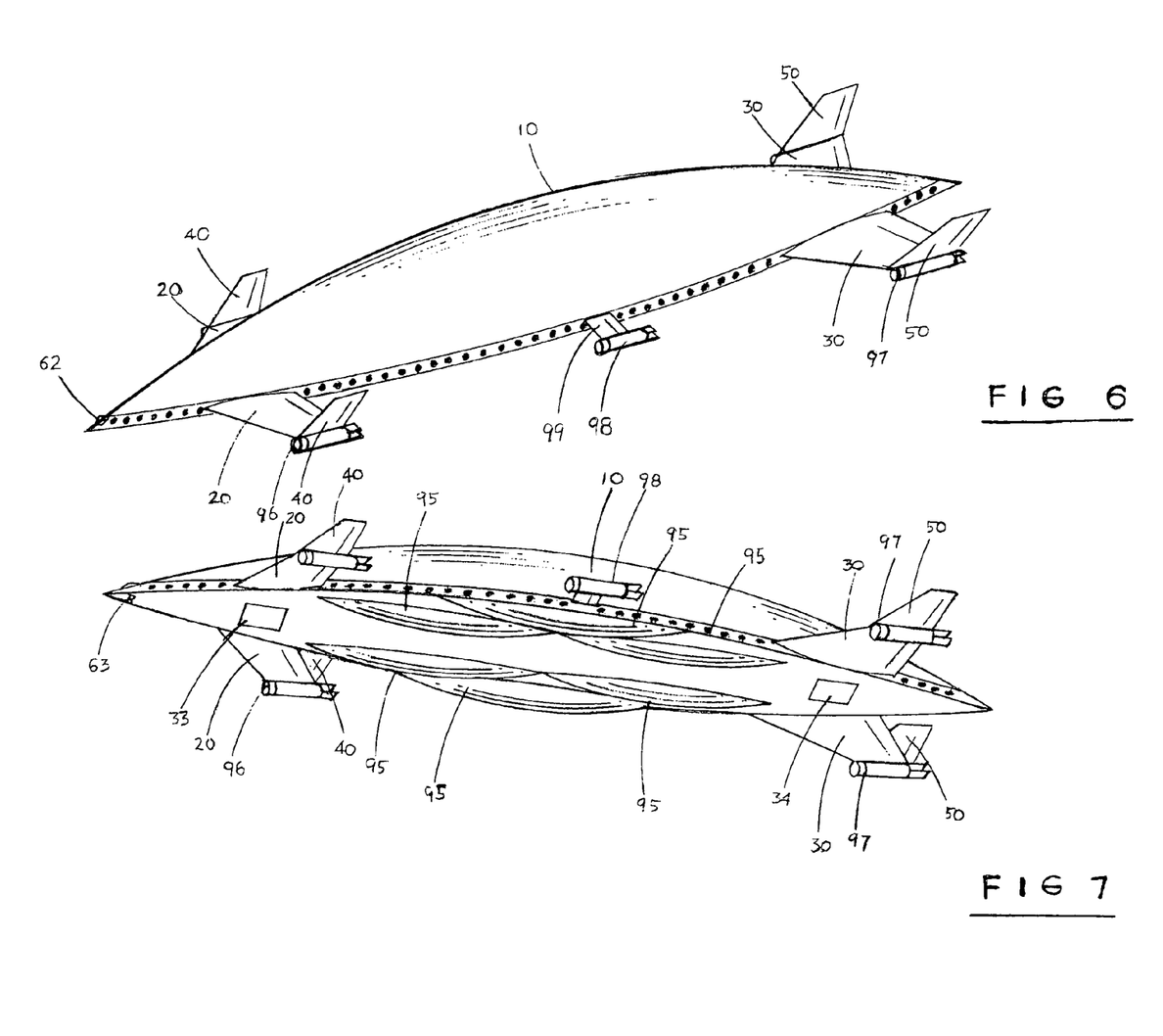
FIG. 6. is a perspective top view of the airship according to another embodiment of The invention of FIG. 1.
FIG. 7. is a perspective bottom view of the airship FIG. 6.
Figure 8:
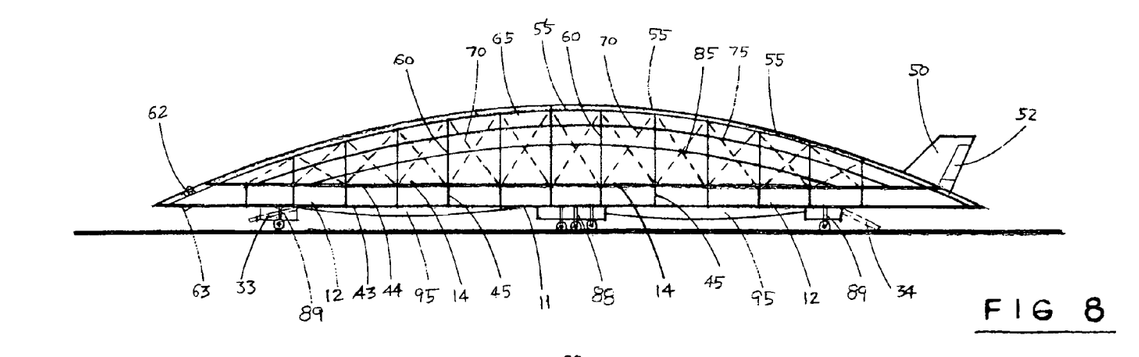
FIG. 8. is a cross sectional side view of the airship FIG. 6.
Figure 9:
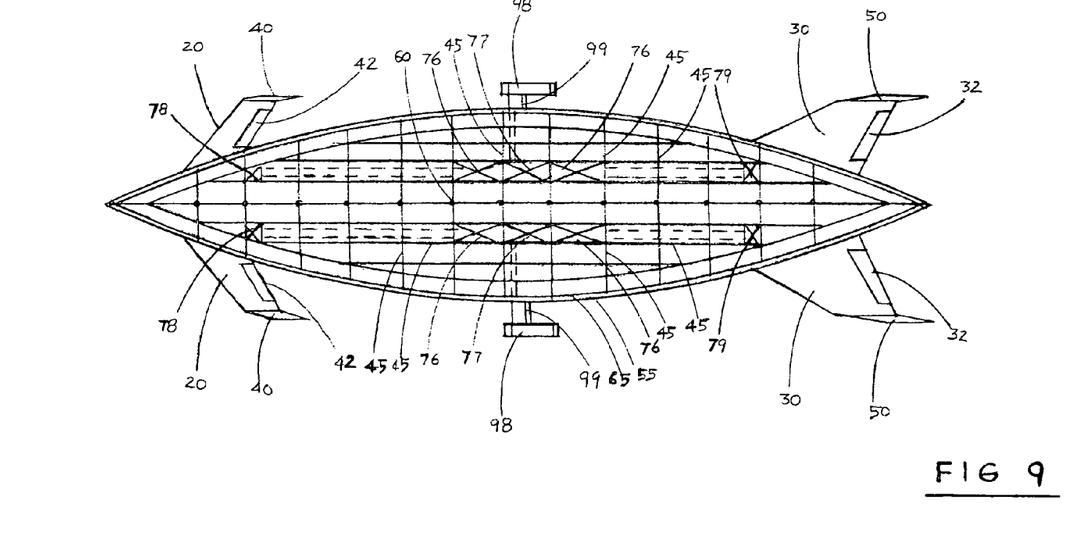
FIG. 9. is a cross sectional top view of first level of an airship FIG. 6.
Figure 10:
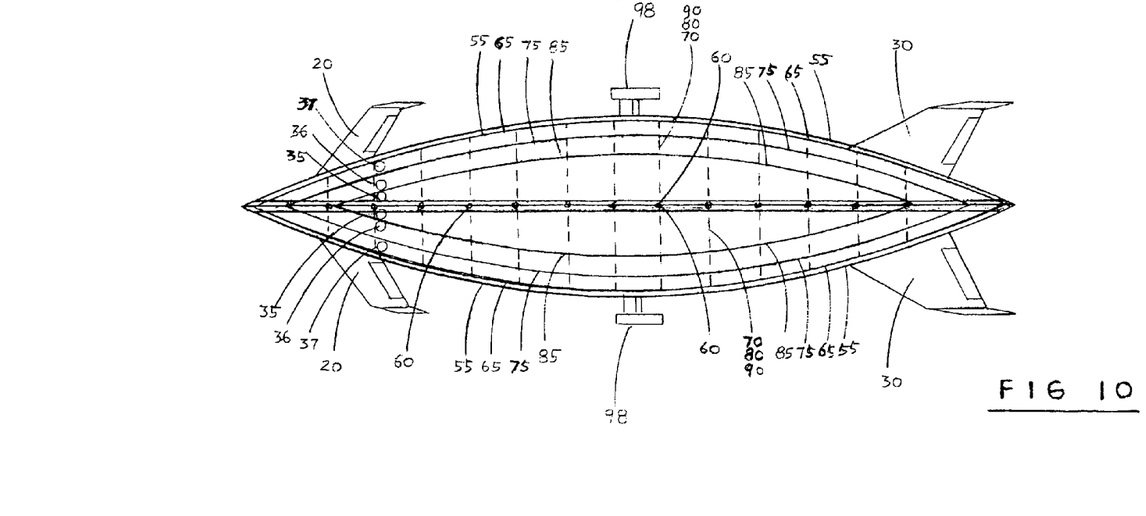
FIG. 10. is a cross sectional top view of second level of an airship FIG. 6.
Figure 11:
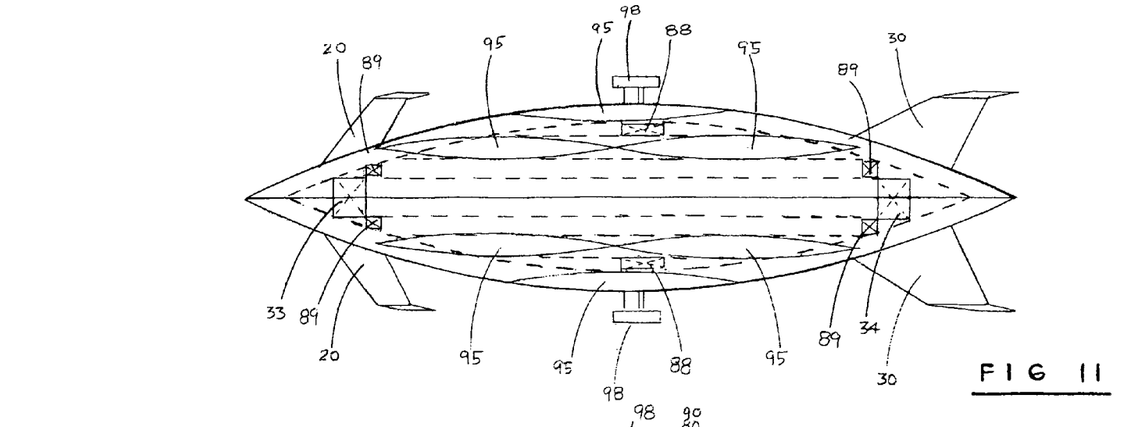
FIG. 11. is a cross sectional bottom belly view of bottom level of an airship FIG. 6.
Figure 14:
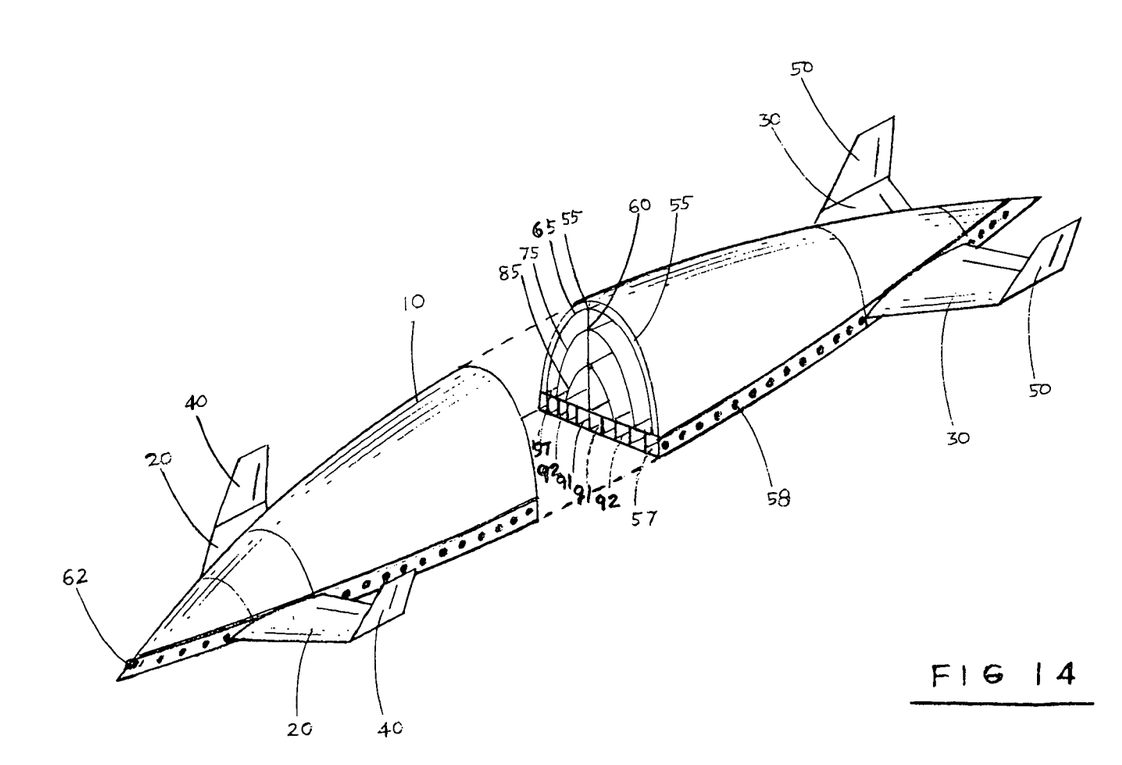
FIG. 14. is a perspective top and partial cross sectional view of an airship of FIG. 6. According to an embodiment of the invention.

The fuselage 10 has a cross section of substantially a half circle shape as shown FIGS. 4, 5 and 14 of fuselage in a direction of width and the fuselage 10 is wide enough to Provide lifting force and comprises two level which are separated by multi-partition 43, 44, 45 and structure as shown FIGS. 8, 9, 10, 14, 15 and 16.

The two front wings 20 are disposed horizontally in front portion of the fuselage 10 And are configured to control flight and lifting force of the airship. The two vertical winglets 40 are disposed at wing tips of the corresponding front wings 20, the two Rear wings 30 are disposed horizontally in rear portion of the fuselage 10 and re-Configured to control flight of the airship. The two vertical winglets 50, are disposed At wing tips of the corresponding rear wings 30, the first level 12, is disposed at a Bottom of the two levels of the fuselage 10, and comprises a plurality of fuel tank Storage 76, each of the plurality of fuel tank storage. A plurality of partition Compartment 91, 92 and a plurality of landing gear bays 88, 89.

The first level 12 is disposed at the bottom or two levels of the fuselage 10, and Comprises a cargo bay 91. The first level 12, is configured to anchor the front wings 20, and the rear wings 30.

The first level 12, is configured to front of fuselage comprises a cockpit 62 and a plurality of passenger cabins 57, the fuselage 10 provided lifting force, and the wings 20, 30, provide lifting force and steering force mainly.

The fuselage 10, may further comprises a bottom cockpit 63, at a front portion of a Belly of the fuselage 10, as shown FIGS. 3, 4, 7, 8 and 13. The bottom cockpit 63, Maybe for controlling the airship 100 during take off and landing and may comprises One of more windows facing downward. The first level 12, may further comprises passenger cabin windows 58, along the wall unit of the passenger compartment.

The fuselage 10, may further comprises high pressurized air bag pontoon 95, anchor To the bottom belly of the fuselage to provide soft air cushion landing at the water Also may landing on grass field as shown FIGS. 4, 5, 13 and 15. The fuselage 10 may Float in water due to the light weight of carbon fiber honey comb composite whole Structure 43, 44, 45 cross inter connected glued and sealed. Also may further special Angle patch 24. Disposed with glue and air tight sealed as shown FIGS. 15 and 16. Since such a structure is water tight as well as air tight sealed with leak proof glued Method. May use as sea landing airship. First level may further comprises a plurality Of seating system 59 and bedding system on passenger cabin 57.

The first level may further comprises plurality of doors along the both side of the Fuselage 10. Each of the two front wings 20, may comprise an elevator 22, each of The two front wings 20, and rear wings 30, may have a cross sectional shape of Laminar flow a clearly seen in FIG. 3, The air foil shape is provided with the wings 20, 30. Each of the two front wings 20, and the rear wings 30, may comprises a plurality of Carbon fiber honey comb sandwich composite wings, 20, 30, which lighter weight And sheer strong composite structure.

A cargo bay 91, in the first level comprises plurality of doors 33, 34 for loading and Unloading.

Figure 15:
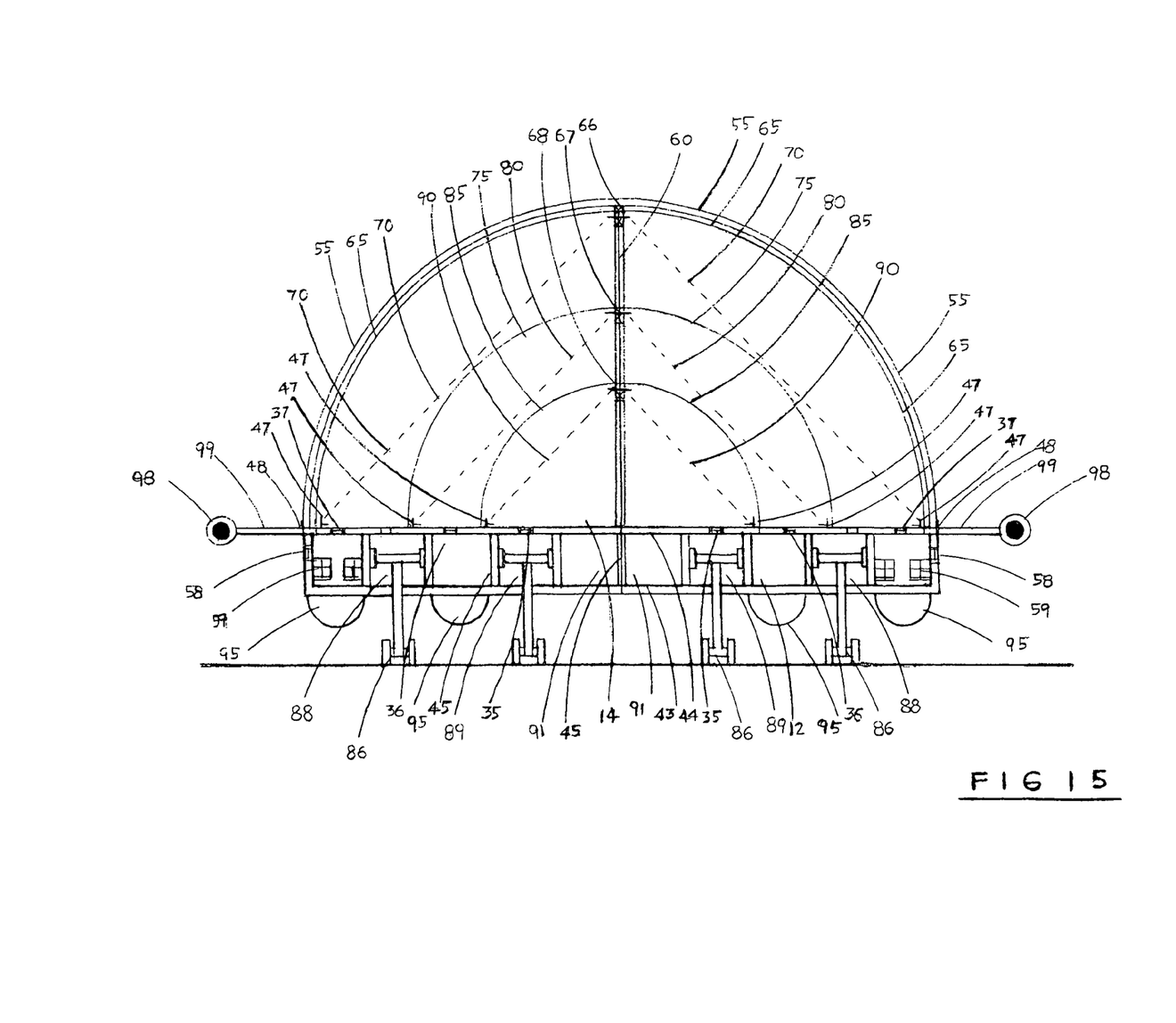
FIG. 15. is a cross section front view of the airship of FIG. 6.

Some of the plurality of landing gear bays 88, 89 may be aligned in two parallel lines In the first level 12, and opened downwardly from under a belly portion of the Fuselage as shown in FIGS. 3, 4, 5, 8 and 15. The first level 12 may further comprise a A plurality of hydraulic operating systems and pneumatic systems for controlling the Landing gears 86, as shown in FIGS. 3, 4, 5, 8 and 15. Each of the fuselage 10, upper Top envelop 55, for the second level may comprises a plurality of carbon fiber honey Comb sandwich composite envelop 55, covered and disposed top of the center beam 66, and along the edge 48 of the floor fuselage structure by glued with narrow Carbon fiber strip as shown in FIGS. 15 and 16.

Figure 16:
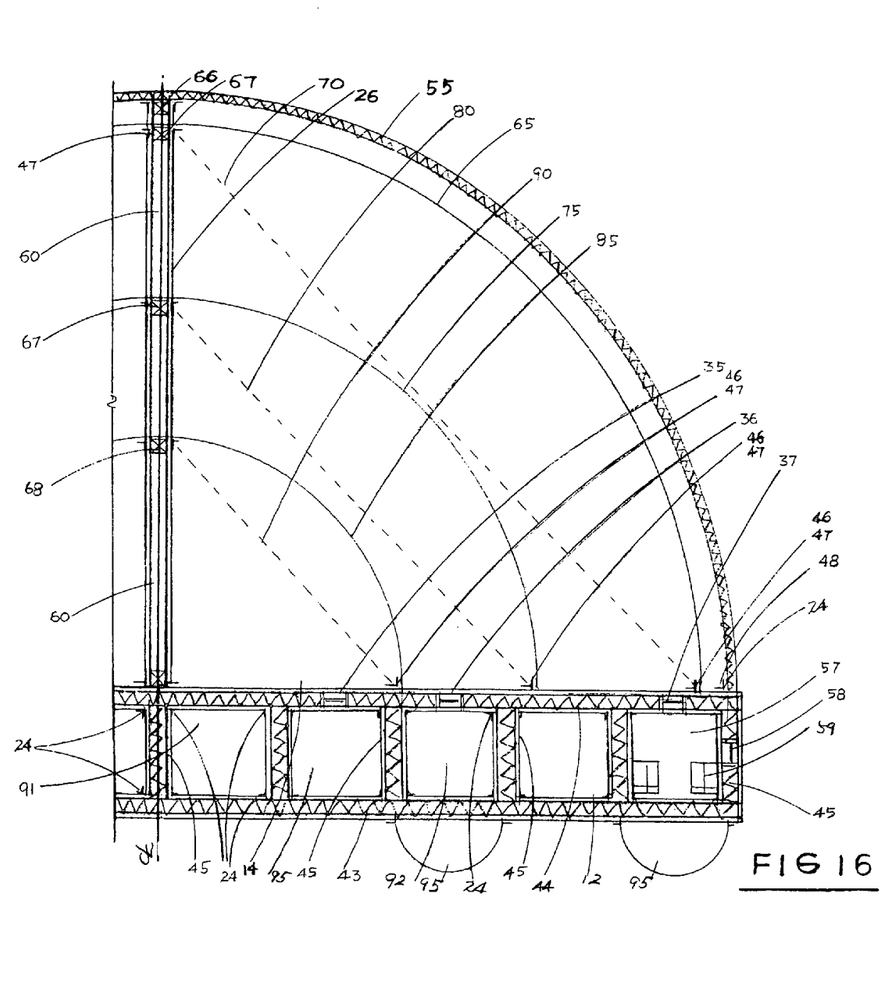
FIG. 16. is a partially cross sectional enlarged front view of the airship of FIG. 15.

At the fuselage 10, each of the envelopes for the second level may comprises a plurality of rubber coated leak proof envelop 65, 66, 67, 68, 75 and edge bracket 47 Of the floor fuselage structure by glued with narrow carbon fiber strip as shown in FIGS. 15 and 16. Each of the envelop 65, 75, 85. Covered each different level portion of The floor space. Each of the fuselage 10 for the second level may comprises plurality Of right sealed floor gate 35, 36, 37 on each envelop covered space floor which each Envelop 65, 75, 85 need each floor gate 35, 36, 37 for to repair and inspection. Each Of the floor gate further comprises valves and controlling gauges for the injecting Gas into the each envelop of floor structure shown in FIG. 16. First level 12 may Further comprises one of more water tank storage station 78, 79 and valves and Controlling gauges. First level 12. May further comprises one of more pumping Stations 77 and valves, controlling gauges for the water tank, lighter than air gas Tanks pneumatic and hydraulic system.

The first level may further comprises pressurized helium gas tank storages. The first Level 12, may further comprises fuel tank storages.

The first level 12, may further comprises multi passenger window 58. Along the wall Units of the passenger cabin. The first level 12. May further comprises one or more Door for each room compartment and storage compartment.

The first level 12, may be integrated with two front wings 20 and the two rear wings 30, as shown in FIGS. 1, 2, 3, 4, 5 and 6. Each of the two front wings 20, and the two Rear wings 30, may comprises one of more elevons 22, 32 each of the two vertical Winglets 40, 50 may comprises a stabilized 42, 52 another aspect of the invention provides an airship 100, comprises a fuselage 10 having a cross section of Substantially a half circle shape of fuselage 10 an a direction of width as shown in FIGS. 4, 5, 14 and 15. The fuselage 10 being wide enough to provide lifting force. The Fuselage 10, may comprises multi jet power plants 96, 97, 98 provide on a portion Of the front wings 20, rear wings 30, and middle extended wing 99. As shown in FIGS. 1, 2, 3, 4, 5 and 6.

Figure 12:
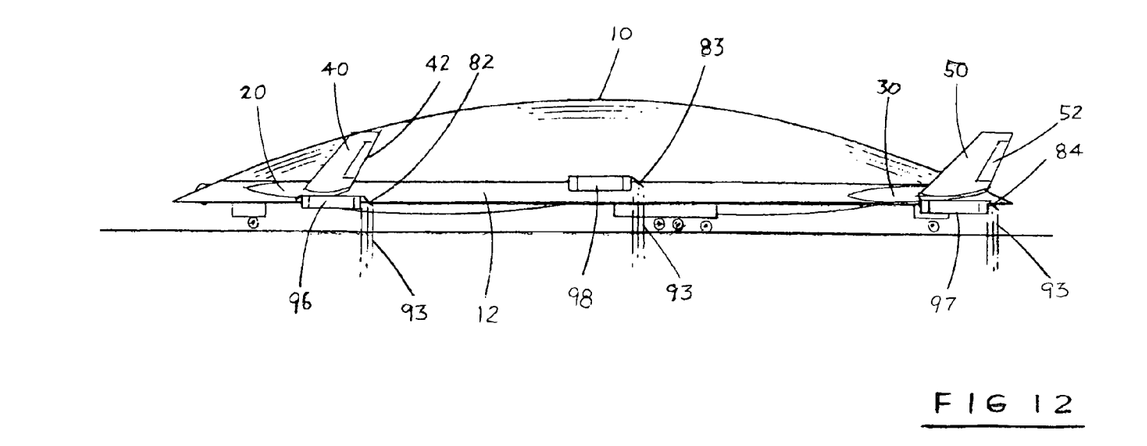
FIG. 12. is a cross sectional side view of a jet engine chute flap down flow action of a Airship FIG. 6.
Figure 13:
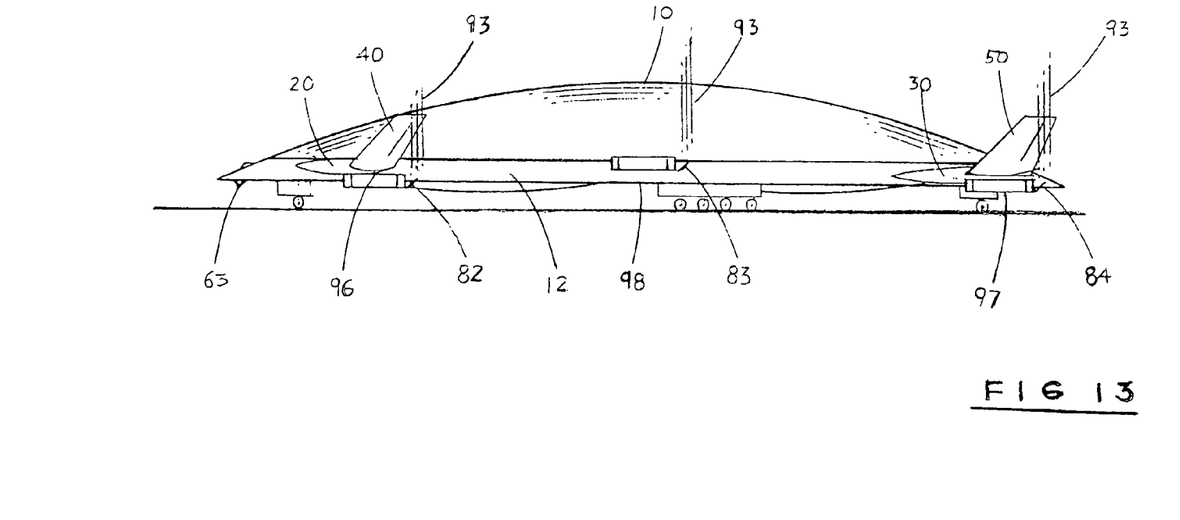
FIG. 13. is a cross sectional side view of a jet engine chute flap upper flow action of an Airship FIG. 6.

An airship comprise jet air stream jet chute flap 82,83,84 on jet powered plant, for The vertical take off and landing capability and jet chute flap 82,83,84 may operate Up and down position to guide jet air stream 93, flow to the down position by jet Chute flat 82,83,84 when vertical take off the airship and two guide jet air stream 93, flow to the up position by jet chute flat 82,83,84 when vertical landing the Airship as shown in FIGS. 12 and 13.

It will be appreciated by those skilled in the art that variations in form detail Composition and operation may be made without departing from the spirit and scope Of the invention as defined by the accompanying claims.

The airship structure of an airship comprising a basic concept of an airship is to provide principle of the floating envelop structure with the fuselage base structure: The construction of the airship disposes a lighter than air gas which is injected into The leak proof envelop covered which is then attached and sealed on the edge of the Ridged floor fuselage structure. The lighter than air gas is expanded in all area Equally to the shape of the envelop structure. The shape of the floor structure which is the base floor structure with fully inflated envelop is leak proof covered on top of The floor structure. Naturally gas bag of envelop float in the airspace. It is called an Airship in which it is equipped with various navigation systems, wing system, landing Gear bays, cargo and passenger cabins, cockpit systems power plants systems, Electric and plumbing systems, hydraulic and pneumatic system, fuel tank systems, Pumping system, water tank system, helium tank system, floating pontoon systems And necessary all control systems. The airship structure comprises a ridged or a semi Ridged envelop disposed on top of the second level fuselage to the edge of the Ridged floor structure. Helium gas is injected into the envelop which leak proof rubber coated carbon fiber fabric is expanded in all areas of the bag of the envelop With the base fuselage structure is envelop mainly in helium gas which provides Major portion of the lifting force of the airship.

What is claimed:

1. An airship comprising:
A lifting fuselage having a rigid flat bottom most surface;
   a curved outer peripheral surface forming the top of the lifting fuselage and is attached to said rigid flat bottom most surface;
   a plurality of vertical center posts positioned within and on the longitudinal axis of said lifting fuselage;
each post having a lower position, intermediate position, and uppermost position wherein
   a first level soft envelop attaches the lower position on each of the vertical center posts;
   a second level soft envelops attaches to the intermediate position on each of the vertical center posts;
   a third level soft envelopes attached to uppermost position on each of the vertical center posts;
air bag pontoons anchor to the flat bottom surface of said lifting fuselage;
and a plurality of wings attached to said lifting fuselage.

2. An airship according to claim 1, further comprising:
Power plants attached to said wings.

3. An airship according to claim 2, further comprising:
Vertical winglets attached to said wings.

4. An airship according to claim 3, further comprising:
A plurality of landing gear bays within said rigid flat bottom most surface supporting landing gears.

5. An airship according to claim 4, further comprising:
A cockpit positioned at the front of said airship.

* * * * *